Figure 3:
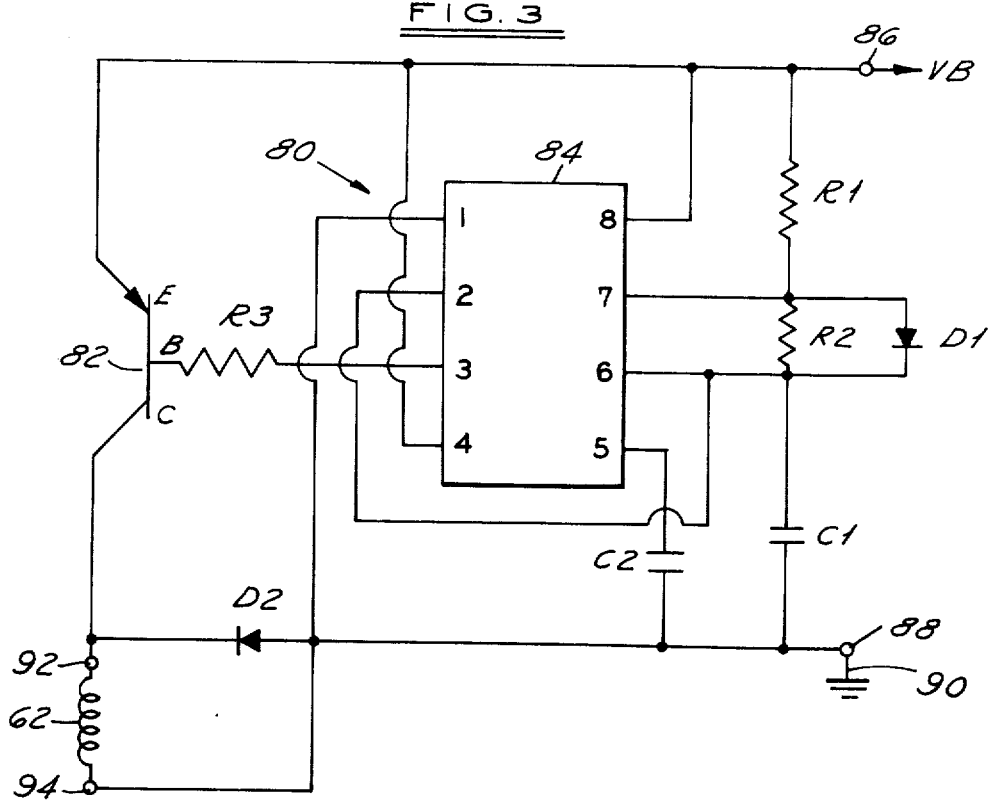

United States Patent [19]

O'Connor et al.

[11] 4,047,852
[45] Sept. 13, 1977

[54] IN-LINE PUMP CONSTRUCTION

[75] Inventors: Alton J. O'Connor; Thomas L. Schrinel, both of Cass City, Mich.

[73] Assignee: Walbro Corporation, Cass City, Mich.

[21] Appl. No.: 714,388

[22] Filed: Aug. 16, 1976

[51] Int. Cl.² .................................... F04B 17/04
[52] U.S. Cl. .................................... 417/415; 417/417
[58] Field of Search .................... 417/415, 416, 417, 418

[56] References Cited
U.S. PATENT DOCUMENTS

| 1,337,388 | 4/1920 | Bradbury | 417/417 |
| 1,844,772 | 2/1932 | LaPointe | 417/416 |
| 2,322,913 | 6/1943 | Best et al. | 417/417 |
| 2,490,505 | 12/1949 | Benjamin | 417/417 |
| 2,495,598 | 1/1950 | Parker | 417/417 |
| 3,250,219 | 5/1966 | McCarty et al. | 417/417 |
| 3,267,868 | 8/1966 | Unger | 417/417 |
| 3,400,663 | 9/1968 | Wertheimer | 417/417 |
| 3,479,959 | 11/1969 | Christensen | 417/417 |
| 3,592,565 | 7/1971 | Kofink | 417/417 |
| 3,601,509 | 8/1971 | Kreitchman | 417/417 |

Primary Examiner—C. J. Husar
Attorney, Agent, or Firm—Barnes, Kisselle, Raisch & Choate

[57] ABSTRACT

An in-line pump construction for mounting in a fuel tank or fuel line having line connections at each end of a tubular construction, valves mounted within the tube and a filter retained by a line connector nipple at the inlet end adjacent a valve module, there being a remote control module positionable at a distance from the pump for easy access and replacement.

6 Claims, 6 Drawing Figures

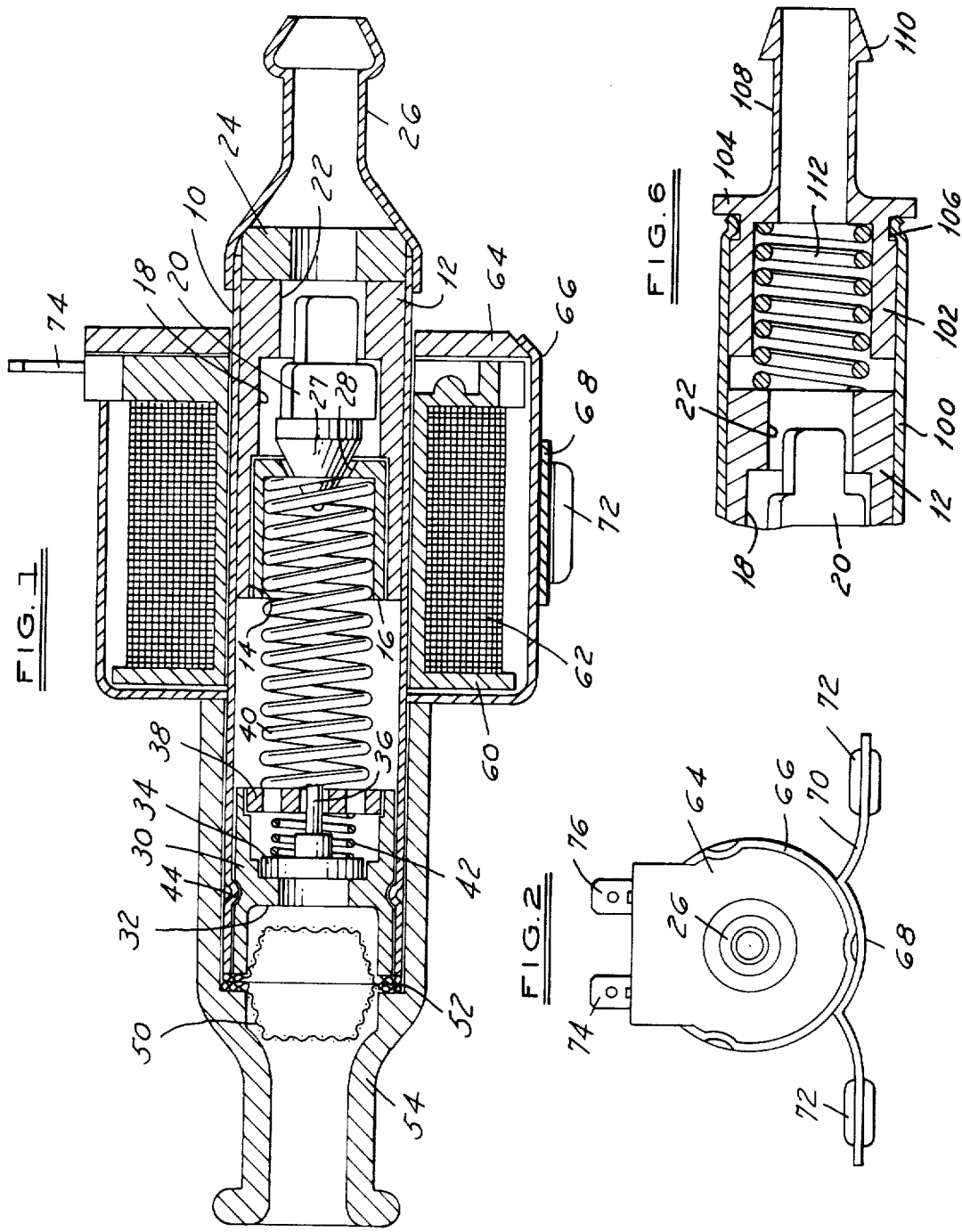

IN-LINE PUMP CONSTRUCTION

This invention relates to an In-Line Pump Construction and more particularly to an electronically operated fuel pump which can be inserted in a fuel line at any convenient place and which has a control system which can be located remotely from the pump again at any conveniently accessible place on a vehicle or other installation.

It is an object of the invention to provide a fuel pump which can be mounted anywhere along a fuel line or even put inside a tank for O.E.M. products. In some cases, it can be attached to a fuel gauge bracket. The control circuit can be mounted under the dash of a vehicle, under the hood on the fire wall, or an inner fender panel or even in the trunk. When an "in-tank" pump malfunctions, it is frequently less expensive to install an in-line pump than to attempt repair.

The pump of the present invention has no points or brushes and is practically trouble free with a very long life. If a failure occurs, it is most likely in the control circuit which can easily be removed and replaced.

The pump design is such that it may be conveniently and inexpensively manufactured using tubular housing parts. A special feature lies in the valve construction wherein a filter at one end can be retained by a slip-on connector to permit easy removal, cleaning and replacement. Other features include the one-way valve mount and the armature design.

Additional objects and features of the invention will be apparent in the following description and claims in which the principles of the invention are set forth together with a detailed presentation directed to those skilled in the art to enable the invention to be practiced, all in connection with the best mode presently contemplated for the practice of the invention.

Drawings accompany the disclosure and the various views thereof may be briefly described as:

FIG. 1, a longitudinal section of the pump showing the various parts in assembly.

FIG. 2, an end view of the pump.

FIG. 3, a schematic view of the control circuit.

Figure 4:
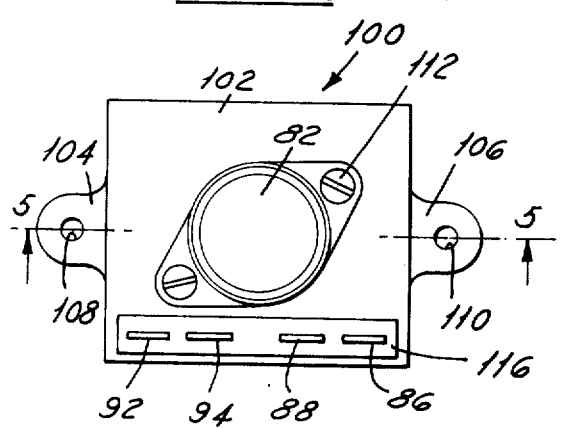

FIG. 4, a plan view of the control circuit assembly.

Figure 5:
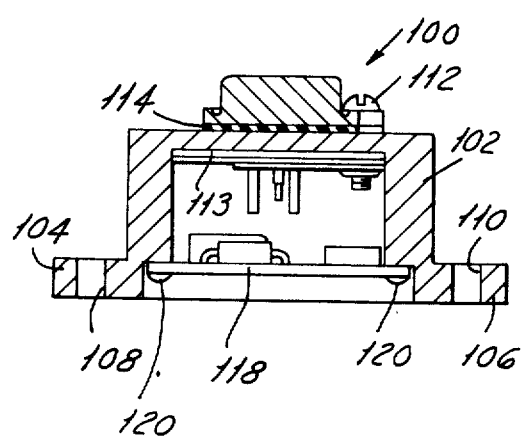

FIG. 5, a sectional view taken along the line 5—5 of FIG. 4.

FIG. 6, a sectional view of a modified end construction incorporating a bumper spring.

With reference to FIG. 1, the main housing element of the pump consists of a straight metallic tube 10 preferably formed of non-ferrous material. Within this tube is a valve armature 12 having a sliding fit with the tube and provided wih a stepped bore having a large end 14 which holds a valve seat cup 16, an intermediate portion 18 which houses an armature valve 20 and a small end 22 in which a portion of the armature valve 20 is located.

A stop ring 24 for the armature is retained on the end of tube 10 by a line fitting 26 tightly fitted on or sweated on the end of tube 10. It will be seen that armature valve 29 has a conical end 27 to cooperate with a conical seat 28 in the valve seat cup 16.

The other end of the tube 10 houses a double-cup tubular valve assembly 30 which has an apertured septum 32 forming a seat for a one-way valve disc 34 having a guide stem 36 piloted in an apertured disc 38 retained in place by a compression coil spring 40 which also seats against the bottom of valve seat cup 16. A light coil spring 42 urges valve disc 34 to a closed position.

The valve assembly 30 has an outside annular groove 44 into which the wall of tube 10 is formed to lock the assembly in place.

At the left-hand end of tube 10 is a filter screen 50 in the form of a double truncated base-to-base cone having a central flange which locks between the ends of the tube 10 and valve assembly 30 and a shoulder 52 on a synthetic rubber or resilient plastic fitting sleeve 54, one end of which slips over the end of tube 10 and the other end of which serves as slip-on fitting for a fuel line end. Thus, the filter can easily be removed, cleaned and/or replaced by pulling off the sleeve 54.

A winding assembly is carried on the outside of the tube 10 comprising a spool 60, winding 62, end plate 64 and housing 66. A mounting bracket 68, shown best in FIG. 2, has two side flanges 70 with insulating groomets 72 in mounting holes. Two solenoids connectors 74, 76 extend upwardly from the solenoid assembly.

The control circuit for the pump is illustrated schematically in FIG. 3 and comprises a frequency-stabilized oscillator 80 connected through a power transistor 82 to drive pump winding 62. Oscillator 80 preferably comprises a basic oscillator circuit 84 in the form of an integrated circuit element together with suitable resistors and capacitors, etc. for determining and stabilizing oscillator output frequency over the expected input voltage range. In the preferred control circuit depicted in and to be described in detail in connection with FIG. 3, integrated circuit 84 is a conventional SE-555 oscillator element manufactured by Synetics Corp. It will be recognized from the following description that other conventional integrated oscillator circuits or, indeed, an oscillator 80 of discrete components may be used where desired.

The series combination of a first resistor R1, a second resistor R2 and a capacitor C1 is connected between the terminals 86, 88, which terminals are respectively connected to a vehicle battery VB and to electrical ground 90. A diode D1 is connected in the forward voltage direction across resistor R2. The junction of resistors R1, R2 is connected to pin 7 of circuit 84, and the junction of resistor R2 and capacitor C1 is connected to pin 6 to establish the charge and discharge time of capacitor C1, and to thereby establish the frequency and duty cycle of oscillator 80. A stabilizing capacitor C2 is connected from circuit pin 5 to terminal 88.

Power is applied to circuit 84 by connecting pins 4 and 8 to battery terminal 86, and by connecting pin 1 to ground through terminal 88. Pin 2 is connected to pin 6. Oscillator output pin 3 is connected through a current limiting resistor R3 to the base B of PNP power transistor 82 which has its emitter E connected to battery terminal 86 and its collector C connected through a control circuit output terminal 92 and through winding 62 to a control terminal 94. Terminal 94 is connected to ground 90 through terminal 88. A diode D2 is connected in the reverse voltage direction across winding 62 to suppress inductive ringing in the winding when transistor 82 turns off. Preferably, the impedance values of resistors R, R2 and capacitor C1 are chosen such that oscillator 82 alternately energizes winding 62 for 16 to 18 milliseconds and de-energizes the winding for about 35 milliseconds. In the oscillator circuit described, this frequency and duty cycle are stable over a battery voltage range of 5 to 18 volts. It will be appreciated, of course, the R1 may be made adjustable to adapt the control circuit for a wide range of desirable pump control cycles.

Referring to FIGS. 4 and 5, the control circuit described in connection with FIG. 3 is preferably embodied in a separate assembly 100 comprising a generally rectangular cup-shaped cover 102 having a pair of opposed fastening ears 104, 106 extending outwardly from the open cover rim. Suitable holes 108, 110 are respectively provided in ears 104, 106 for mounting assembly 100 in any desired location. Power transistor 82 is mounted by screws 112 to a transistor socket 113 disposed on the closed end of cover 102 with an insulating wafer 114 disposed between the transistor case and the opposing cover surface. Control terminals 86, 88, 92 and 94 are carried by cover 102 and are insulated therefrom by suitable material 116. Pump winding 62 (FIGS. 1–3) and the vehicle battery may be connected to terminals 86, 88, 92 and 94 as depicted in FIG. 3 by suitably terminated leads (not shown). The remaining control circuit components are carried in a printed circuit board assembly 118 mounted by screws 120 onto a ledge formed internally of the open cover rim and are encapsulated therein by epoxy resin or the like. Board assembly 118 is connected to transistor 82 and to terminals 86, 88, 92, 94 by suitable conductors (not shown). It will thus be appreciated that power transistor 82 may be readily replaced, and that the remainder of control circuit assembly 100 comprises a relatively inexpensive "throwaway" assembly.

In FIG. 6, a modified end construction for the device is shown. In this embodiment, a tube 100, containing the valve armature 12 and the armature valve 20, is extended to receive a cup 102 having a base flange 104 adjacent a groove 106. The cup 102 has a hollow stem ending in a nipple connection 110 for a tube. Housing 100 is crimped or formed at 111 into groove 106 to retain the parts in assembly.

A shock absorber spring 112 is located, guided and bottomed in cup 102 at one end and serves as a cushion for armature 12 at the other end. This spring absorbs the shock of the armature in its rightward stroke and provides a quieter operation where this is desired.

We claim:

1. A fuel pump adapted for mounting in a fuel line which comprises:
   a. a tube forming a body,
   b. a solenoid coil assembly mounted concentrically around one end of said body,
   c. a tubular armature slidable in said body in the area surrounded by said coil, said armature having a stepped bore, one end of said stepped bore serving as a guide for a flow check valve, the other end of said bore serving as a valve seat retainer,
   d. a cup-shaped valve seat having a valve opening in the bottom thereof and positioned in said other end of said stepped bore,
   e. a slidable flow check valve member guide in said bore having a valve portion to cooperate with said valve opening in said valve seat,
   f. a second valve housing at the other of said body having a valve seat and valve recess,
   g. a valve in said valve recess to cooperate with said seat,
   h. spring means interposed between said cup-shaped valve seat and said second valve housing to serve as a retainer for said cup-shaped valve seat and a resilient bias for said armature, and
   i. means to retain said second valve housing in said body against said spring means.

2. A fuel pump as defined in claim 1 in which a filter is interposed in said other end of said body having a flange portion engaged with said second valve housing, and a line connector telescoped over said other end of said body having a portion to engage and position said filter in said tube.

3. A fuel pump as defined in claim 1 in which an armature stop ring is positioned at said one end of said body axially of said armature, and a line connector nipple fastened on said one end of said body having a portion to axially engage said stop ring to hold it in position within said tube.

4. A fuel pump as defined in claim 1 in which said tube is closed at the armature end by a cupshaped element, and a spring seated at one end in said element and having its other end extending into said tube to serve as a shock absorber for said armature.

5. A fuel pump as defined in claim 4 in which said cup-shaped element has a hollow stem extending from the bottom of said cup to serve as a hose connector.

6. A fuel pump as defined in claim 5 in which said cup-shaped element has an annular groove formed in the outer surface thereof, said tube being formed into said groove to retain said element in said tube.

* * * * *